(12) United States Patent
Wada et al.

(10) Patent No.: US 7,294,304 B2
(45) Date of Patent: Nov. 13, 2007

(54) DIE FOR FORMING HONEYCOMB STRUCTURE AND METHOD OF MANUFACTURING HONEYCOMB STRUCTURE

(75) Inventors: Yukihisa Wada, Nisshin (JP); Tomohiro Iida, Nagoya (JP); Jiro Maeda, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 72 days.

(21) Appl. No.: 11/268,598

(22) Filed: Nov. 8, 2005

(65) Prior Publication Data
US 2006/0103058 A1 May 18, 2006

(30) Foreign Application Priority Data
Nov. 17, 2004 (JP) ............................. 2004-333436

(51) Int. Cl.
*B28B 3/06* (2006.01)
*B29C 47/12* (2006.01)

(52) U.S. Cl. ................. 264/630; 264/177.12; 425/461; 425/462

(58) Field of Classification Search ................ 425/198, 425/288, 380, 382 R, 460–464; 264/177.11, 264/177.12; 428/134, 598
See application file for complete search history.

(56) References Cited

U.S. PATENT DOCUMENTS

| 4,687,433 A | 8/1987 | Ozaki et al. |
| 4,741,792 A * | 5/1988 | Matsuhisa et al. ........ 156/89.22 |
| 4,767,309 A | 8/1988 | Mizuno et al. |
| 4,830,598 A * | 5/1989 | Inoue et al. ................. 425/463 |
| 5,008,509 A * | 4/1991 | Hattori et al. ........... 219/69.15 |
| 5,108,685 A | 4/1992 | Kragle |
| 5,238,386 A | 8/1993 | Cunningham et al. |
| 5,964,020 A * | 10/1999 | Kragle et al. .................. 29/423 |
| 2005/0161148 A1* | 7/2005 | Fukuta et al. ............. 156/89.22 |
| 2006/0249888 A1* | 11/2006 | Ishihara et al. .............. 264/630 |

FOREIGN PATENT DOCUMENTS

| EP | 0 196 791 | 10/1986 |
| EP | 0 250 166 | 12/1987 |

* cited by examiner

Primary Examiner—James P. Mackey
Assistant Examiner—Dimple N. Bodawala
(74) Attorney, Agent, or Firm—Oliff & Berridge, PLC

(57) ABSTRACT

There is disclosed a die for forming a honeycomb structure and a method of manufacturing the honeycomb structure by use of the die, in which variations of cell pitches are suppressed in a central portion and the vicinity of an outer periphery after drying and firing an extruded honeycomb structure, and the honeycomb structure having a uniform cell pitch can be manufactured. A die 1 for forming a honeycomb structure has a front surface provided with groovy slits 2 formed between cell blocks 3 and a back surface provided with back holes 4a communicating with the slits 2. The die 1 has a structure in which a pitch P of the adjacent cell blocks 3 is enlarged from a central portion of the front surface toward an outer periphery in a stepwise manner.

4 Claims, 3 Drawing Sheets

DIE FOR FORMING HONEYCOMB STRUCTURE AND METHOD OF MANUFACTURING HONEYCOMB STRUCTURE

BACKGROUND OF THE INVENTION

1. Field of the Invention

The present invention relates to a die for forming a honeycomb structure for use in extrusion of a honeycomb structure.

2. Description of Related Art

In recent years, a honeycomb structure made of a ceramic superior in resistances to heat and corrosion has been utilized in various fields such as a diesel particulate filter (DPF) for capturing particulates discharged from a diesel engine, and a catalyst carrier for carrying a catalyst which purifies automobile exhaust gas.

In general, a honeycomb structure (formed article) obtained by extrusion is dried and fired to thereby manufacture the honeycomb structure. A die for use in extrusion of the honeycomb structure has a structure in which groovy slits are disposed by a plurality of cell blocks in the front surface of a matrix made of stainless steel, iron or the like, and back holes communicating with the slits are disposed in the back surface. When a forming raw material (clay) introduced from the back holes is extruded from the slits, the formed article having a honeycomb structure is obtained. That is, the clay passed and extruded through the slits in the die forms partition walls which surround each cell (through hole), and the cell blocks block a flow of the clay to form hollow portions which are the cells.

Additionally, in the conventional die for forming the honeycomb structure, pitches of the adjacent cell blocks are all constant, but in the honeycomb structure extruded using such a die and obtained through drying and firing, pitches of the cells (cell pitches) are not constant. There is a case where the cell pitch in the vicinity of an outer periphery is smaller than that of a central portion. This is supposedly because the cell pitches change with the central portion and the vicinity of the outer periphery owing to occurrence of deformation/distortion by non-uniform heating at a drying time or the like. When the cell pitch in the vicinity of the outer periphery decreases, an outer dimension of the whole honeycomb structure decreases, and sometimes deviates from standards of a product (a prior-art document concerning such conventional situation is not found).

SUMMARY OF THE INVENTION

The present invention has been developed in view of such conventional circumstances, and an object thereof is to provide a die for forming a honeycomb structure and a method of manufacturing the honeycomb structure by use of the die, in which variations of cell pitches are suppressed in a central portion and the vicinity of an outer periphery after drying and firing an extruded honeycomb structure, and the honeycomb structure having a uniform cell pitch can be manufactured.

According to the present invention, there is provided a die for forming a honeycomb structure (the first die for forming a honeycomb structure), the die comprising a front surface provided with groovy slits, each of the slits being formed between cell blocks; and a back surface provided with back holes, each of the back holes communicating with the slits, wherein a pitch of the adjacent cell blocks is enlarged from a central portion of the front surface toward an outer periphery in a stepwise manner.

Moreover, according to the present invention, there is provided a die for forming a honeycomb structure (the second die for forming a honeycomb structure), the die comprising: a front surface provided with groovy slits, each of the slits being formed between cell blocks; and a back surface provided with back holes, each of the back holes communicating with the slits, wherein a pitch of the adjacent cell blocks is constant in a predetermined area of a central portion of the front surface, and the pitch is enlarged in an area outside the predetermined area toward an outer periphery in a stepwise manner.

Furthermore, according to the present invention, there is provided a method of manufacturing a honeycomb structure using the first or second die for forming a honeycomb structure.

According to the die for forming the honeycomb structure and the method of manufacturing the honeycomb structure in the present invention, it is possible to suppress the variations of the cell pitches between the central portion and the vicinity of the outer periphery after drying and firing the extruded honeycomb structure (formed article) to manufacture the honeycomb structure having the uniform cell pitch.

BRIEF DESCRIPTION OF THE DRAWINGS

FIG. 1(a) is a plan view showing a front surface, and FIG. 1(b) is a partial sectional view;

DESCRIPTION OF THE PREFERRED EMBODIMENT

Figure 1A:
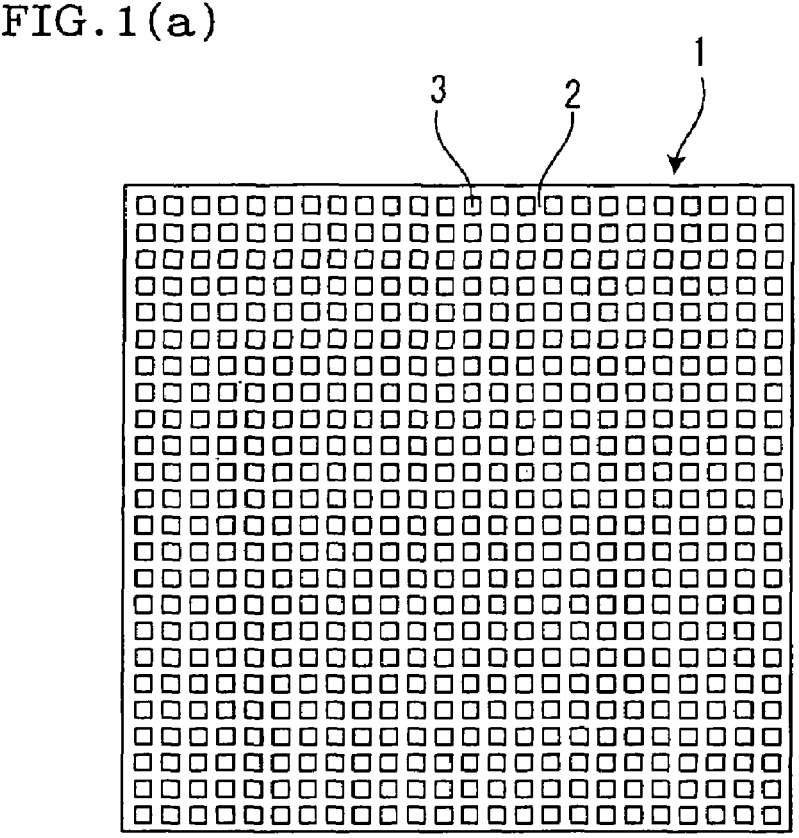
FIGS. 1(a) and 1(b) are explanatory views showing a basic structure of a die for forming a honeycomb structure of the present invention.
Figure 1B:
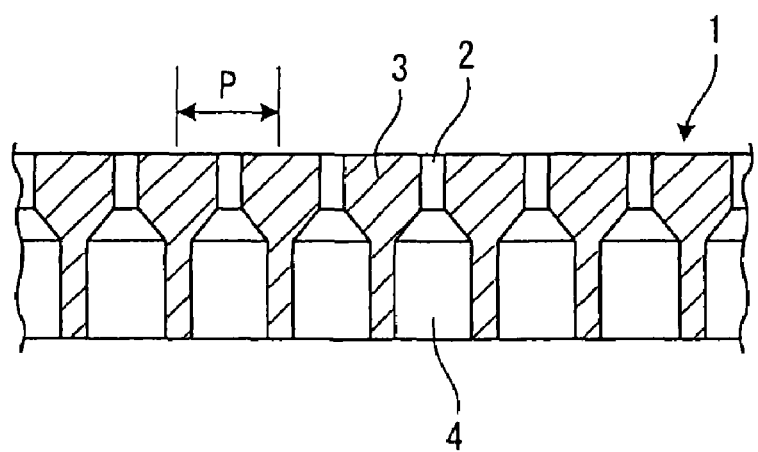

FIGS. 1(a) and 1(b) are a plan view showing a front surface and a partial sectional view, both showing a basic structure of a die for forming a honeycomb structure of the present invention and viewed from a surface side. In the present invention, a die 1 for forming a honeycomb structure has a surface provided with groovy slits 2 formed by a plurality of cell blocks 3 and a back surface provided with back holes 4 communicating with the slits 2. When a forming raw material (clay) introduced from the back holes 4 is extruded from the slits 2, a formed article having a honeycomb structure is obtained.

Moreover, in addition to such a basic structure, the first die for forming a honeycomb structure of the present invention has a characteristic structure in which a pitch P of the adjacent cell blocks 3 is enlarged from a central portion of the front surface of the die toward an outer periphery in a stepwise manner.

As described above, the honeycomb structure (fired article) which is a final product is conventionally obtained by forming a honeycomb structure (formed article) using a conventional die in which the pitches of the cell blocks are all constant, followed by drying and firing. In such a honeycomb structure, there is a case where the cell pitch in the vicinity of the outer periphery is smaller than that of the central portion because of occurrence of deformation/distortion by non-uniform heating at a drying time or the like.

In this case, usually, the cell pitch in a sectional central portion of the honeycomb structure is broadest, and the cell pitch gradually narrows toward the outer periphery.

In order to suppress such variations of cell pitch, and obtain the honeycomb structure having the uniform cell pitch, a formed article may be prepared in which the cell pitch in the vicinity of the outer periphery is larger than that of the central portion in an extruding step to make allowance for variations of shrinkage of the cells occurs at the drying time or the like. In the extrusion of the honeycomb structure, clay passed through the slits of the die forms partition walls which partition the cells, and the cell blocks block a flow of the clay to form hollow portions which are the cells. Therefore, the cell pitch of the formed article agrees with the pitch of the adjacent cell blocks of the die.

Therefore, the first die for forming a honeycomb structure is structured in such a manner that the pitch of the adjacent cell blocks is enlarged stepwise from the central portion of the front surface of the die toward the outer periphery. When the extrusion is performed using this die, the honeycomb structure (formed article) is obtained whose cell pitch is enlarged from the central portion toward the outer periphery in the stepwise manner.

It is to be noted that an enlarged amount of the pitch of the adjacent cell blocks is preferably set to a range of about 0.005 to 0.1 mm per step. When the enlarged amount per step is less than 0.005 mm, there is little effect of enlarging the cell pitch. When the amount exceeds 0.1 mm, there sometimes occurs a problem of extrudability due to a difference of an extruded amount of clay between the cells. To obtain a more specific enlarged amount, first the honeycomb structure (formed article) is extruded using the die having a conventional structure in which the pitches of the cell blocks are all constant, then the honeycomb structure (fired article) is obtained through the drying and the firing. As to the honeycomb structure, a degree is checked by which the cell pitch narrows from the central portion toward the outer periphery. Based on the result, the amount may be set to such a value as to compensate variations of a final cell pitch and obtain a uniform cell pitch.

As to the second die for forming a honeycomb structure of the present invention, in the same manner as in the first die for forming a honeycomb structure, a formed article is prepared in which the cell pitch in the vicinity of the outer periphery is larger than that of the central portion for a purpose of suppressing variations of a final cell pitch. In a characteristic structure, a pitch P of adjacent cell blocks 3 is constant in a predetermined area (hereinafter referred to as the "central area") of a central portion of the front surface of the die, and enlarged toward an outer periphery in a stepwise manner in an area (hereinafter referred to as the "outer area") outside the central area.

As described above, in a case where the variations occur in the final cell pitch because of occurrence of deformation/distortion by non-uniform heating at a drying time, the cell pitch in a sectional central portion of the honeycomb structure is broadest, and the cell pitch tends to gradually narrows toward the outer periphery. However, in many cases, the variations of the cell pitch are comparatively small in the vicinity of the sectional central portion that is distant from the outer periphery to a certain degree.

Therefore, in the second die for forming a honeycomb structure, the front surface of the die is divided into the central area and the outer area, the pitch of the adjacent cell blocks is set to be constant in the central area of the die corresponding to the area in the vicinity of the sectional central portion of the honeycomb structure in which the variations of the cell pitch are comparatively small, and the pitch of the adjacent cell blocks is enlarged toward the outer periphery in a stepwise manner only in the outer area of the die.

To determine a boundary between the central area and the outer area, first a honeycomb structure (formed article) is formed using the die for forming a honeycomb structure having the conventional structure in which the pitches of the cell blocks are all constant. As to the honeycomb structure (fired article) obtained by drying and firing the formed article, the cell pitches are checked. There is regarded as the central area an area of the die surface corresponding to the area in the vicinity of the sectional central portion of the honeycomb structure in which the variations of the cell pitches are in an allowable range, and the area outside the central area may be regarded as the outer area. It is to be noted that a preferable enlarged amount of the pitch of the adjacent cell blocks in the outer area, and a method of determining a specific enlarged amount are similar to those of the first die for forming a honeycomb structure.

In the second die for forming a honeycomb structure, since the pitch of the adjacent cell blocks of the central area is constant, the die is slightly inferior to the first die for forming a honeycomb structure in micro adjustment of the cell pitch in the vicinity of the sectional central portion of the honeycomb structure, but there is an advantage that the die itself is more easily prepared.

Next, a method of manufacturing a honeycomb structure of the present invention will be described. The method of manufacturing the honeycomb structure of the present invention is characterized in that the honeycomb structure is manufactured using the first or second die for forming a honeycomb structure. As described above, when the first or second die for forming a honeycomb structure is used, a formed article is obtained in which a cell pitch is enlarged beforehand toward an outer periphery in the vicinity of the outer periphery having a tendency to reduce a final cell pitch because of occurrence of deformation/distortion by non-uniform heating at a drying time. Therefore, the cell pitch of the honeycomb structure finally obtained through drying and firing can be set to be constant.

It is to be noted that the specific manufacturing method of the present invention is similar to the conventional known method of manufacturing the honeycomb structure except that the first or second die for forming a honeycomb structure is used as the die. That is, a predetermined raw material is kneaded to obtain clay mixture for forming, the clay mixture is supplied to back holes in the die mounted to a jig so that the clay mixture is extruded to obtain the formed article, and the obtained formed article is dried and fired on predetermined conditions.

The present invention will be described hereinafter in accordance with examples in more detail, but the present invention is not limited to these examples.

EXAMPLE

A die for forming a honeycomb structure was prepared in which there were 24 cell blocks in each of longitudinal and lateral directions as shown in FIG. 1(a). The die was constituted in such a manner that a region for ten cell blocks from an outer periphery toward a central portion was regarded as an outer area, a region inside the area was regarded as a central area, a pitch of the adjacent cell blocks in the central area was 1.55 mm, and the pitch of the outer area broadened every 0.01 mm from the pitch of the central area with respect to each cell block from the inside toward the outer periphery.

This die for forming a honeycomb structure was mounted to a die jig, and clay mixture of an argillaceous Si—SiC material is extruded to form a honeycomb structure. It is to be noted that the clay mixture was obtained by adding water, an organic binder, a surfactant, sucrose (starch) having a pore forming effect, foaming resin, and calcium carbonate as an auxiliary sintering agent to a powder material of metal silicon (Me—Si) and SiC at a mass ratio of 25:75, and kneading them.

The formed article obtained by the extrusion was dried by microwave drying and hot air drying for one hour, and subsequently fired at 1450° C. for 60 hours to obtain a honeycomb structure (fired article) having a square sectional outer periphery shape and including 24 cells in each of longitudinal and lateral directions. This honeycomb structure was cut vertically to a longitudinal direction in a center of the longitudinal direction (axial direction), and the cell pitches were measured on the cut surface.

Figure 2:
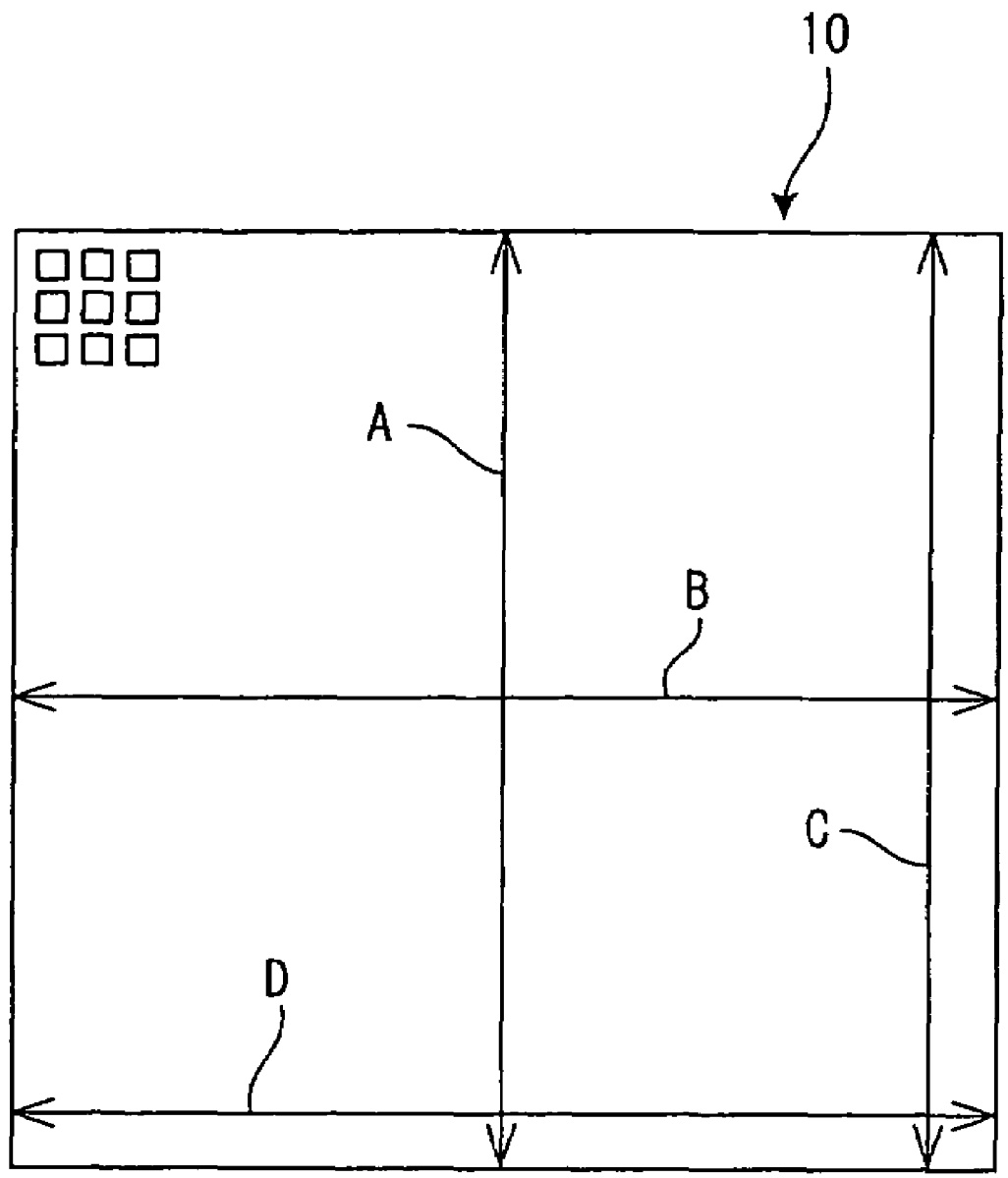
FIG. 2 is an explanatory view showing measuring positions of cell pitches in the Example and the Comparative Example.
Figure 3:
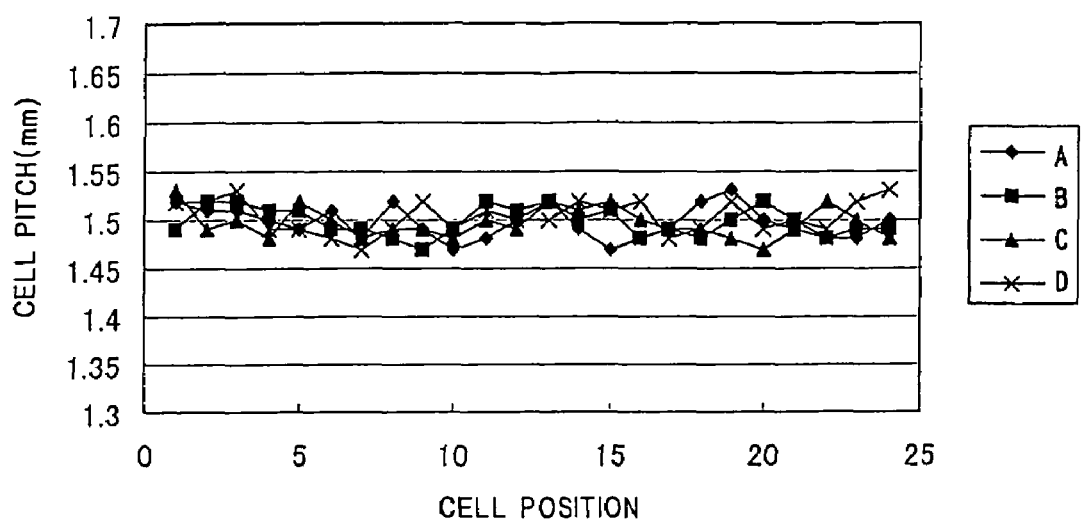
FIG. 3 is a graph showing results of an example.

As shown in FIG. 2, the measuring of the cell pitches was performed with respect to the cells positioned on four lines A to D on the cut surface of the honeycomb structure 10. The results are shown in a graph of FIG. 3. It is to be noted that as to values of "cell positions" along the abscissa of the graph, values 1 and 24 correspond to cell positions closest to the outer periphery in opposite end portions of each of the lines. The results are shown in FIG. 3. It has been confirmed that variations of the cell pitches are small in any line, there is hardly a difference of the cell pitch between the lines, and the cell pitches in the whole section are substantially uniform.

COMPARATIVE EXAMPLE

Figure 4:
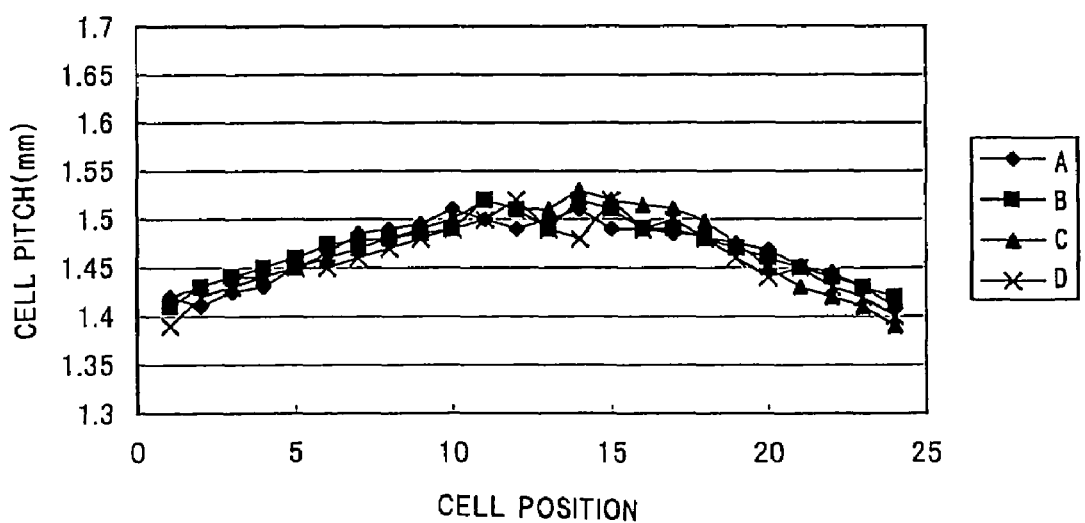
FIG. 4 is a graph showing results of a comparative example.

A honeycomb structure was obtained in the same manner as in the above-described example except that a die for forming a honeycomb structure was used having a conventional structure in which pitches of adjacent cell blocks were all 1.55 mm, and the cell pitches were similarly measured. The results are shown in a graph of FIG. 4. As shown in FIG. 4, it has been confirmed that cell pitches decrease toward an outer peripheral portion, and a large cell pitch difference is made between a central portion and the outer peripheral portion in the honeycomb structure prepared using the die for forming a honeycomb structure having the conventional structure in which a pitch of the adjacent cell blocks is constant.

The present invention can be preferably utilized in manufacturing a honeycomb structure for use in a DPF for capturing particulates discharged from a diesel engine, a catalyst carrier for carrying a catalyst which purifies an automobile exhaust gas or the like.

What is claimed is:

1. A die for forming a honeycomb structure, the die comprising:
   a front surface provided with groovy slits, each of the slits being formed between cell blocks; and
   a back surface provided with back holes, each of the back holes communicating with the slits,
   wherein a pitch of the adjacent cell blocks is enlarged from a central portion of the front surface toward an outer periphery in a stepwise manner.

2. A die for forming a honeycomb structure, the die comprising:
   a front surface provided with groovy slits, each of the slits being formed between cell blocks; and
   a back surface provided with back holes, each of the back holes communicating with the slits,
   wherein a pitch of the adjacent cell blocks is constant in a predetermined area of a central portion of the front surface, and the pitch is enlarged in an area outside the predetermined area toward an outer periphery in a stepwise manner.

3. A method of manufacturing a honeycomb structure comprising:
   extruding a raw material in a die to form an article, and drying and firing the article to form the honeycomb structure,
   wherein the die comprises:
   a front surface provided with groovy slits, each of the slits being formed between cell blocks; and
   a back surface provided with back holes, each of the back holes communicating with the slits,
   wherein a pitch of the adjacent cell blocks is enlarged from a central portion of the front surface toward an outer periphery in a stepwise manner.

4. A method of manufacturing a honeycomb structure comprising:
   extruding a raw material in a die to form an article, and drying and firing the article to form the honeycomb structure,
   wherein the die comprises:
   a front surface provided with groovy slits, each of the slits being formed between cell blocks; and
   a back surface provided with back holes, each of the back holes communicating with the slits,
   wherein a pitch of the adjacent cell blocks is constant in a predetermined area of a central portion of the front surface, and the pitch is enlarged in an area outside the predetermined area toward an outer periphery in a stepwise manner.

* * * * *